(12) United States Patent
Barrett et al.

(10) Patent No.: US 11,881,108 B2
(45) Date of Patent: Jan. 23, 2024

(54) SYSTEMS AND METHODS FOR VIRTUAL PARKING LOT SPACE ALLOCATION

(71) Applicant: Ford Global Technologies, LLC, Dearborn, MI (US)

(72) Inventors: Jordan Barrett, Milford, MI (US); Brendan Diamond, Grosse Pointe, MI (US); Michael Alan Mcnees, Flat Rock, MI (US); Keith Weston, Canton, MI (US); Andrew Denis Lewandowski, Sterling Heights, MI (US); Stuart C. Salter, White Lake, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 17/574,538

(22) Filed: Jan. 12, 2022

(65) Prior Publication Data

US 2023/0222912 A1    Jul. 13, 2023

(51) Int. Cl.
*G08G 1/14* (2006.01)
*G06Q 10/02* (2012.01)
*G08G 1/0967* (2006.01)
*G08G 1/01* (2006.01)
*G08G 1/015* (2006.01)

(52) U.S. Cl.
CPC ............ *G08G 1/143* (2013.01); *G06Q 10/02* (2013.01); *G08G 1/015* (2013.01); *G08G 1/0112* (2013.01); *G08G 1/0967* (2013.01); *G08G 1/146* (2013.01); *G08G 1/148* (2013.01)

(58) Field of Classification Search
CPC ...... G08G 1/143; G08G 1/0112; G08G 1/015; G08G 1/0967; G08G 1/146; G08G 1/148; G06Q 10/02
See application file for complete search history.

(56) References Cited

U.S. PATENT DOCUMENTS

| 2016/0078759 | A1* | 3/2016 | Nerayoff ............... G08G 1/0175 701/3 |
| 2017/0206786 | A1 | 7/2017 | Dhondse et al. |
| 2018/0025640 | A1* | 1/2018 | Micks ....................... G08G 1/14 340/932.2 |
| 2018/0232958 | A1* | 8/2018 | Wang ...................... G06Q 20/42 |
| 2019/0251842 | A1* | 8/2019 | Wunder .................. G07C 5/008 |

(Continued)

FOREIGN PATENT DOCUMENTS

WO     2019138763 A1    7/2019

OTHER PUBLICATIONS

K.Thamizharasi "Online Parking and Space Allotment Mechanism" (May 2021).

(Continued)

*Primary Examiner* — Ryan W Sherwin
(74) *Attorney, Agent, or Firm* — Frank Lollo; Eversheds Sutherland (US) LLP

(57) ABSTRACT

This disclosure describes systems and methods for virtual parking lot space allocation. An example method may include receiving, by a processor and from a first vehicle, sensor data relating to a first location. The example method may also include generating, by the processor and based on the sensor data, a first virtual parking space of a virtual parking location within the first location.

16 Claims, 11 Drawing Sheets

(56) References Cited

U.S. PATENT DOCUMENTS

2019/0318628 A1* 10/2019 Ma .................. G01S 5/0247
2019/0353489 A1    11/2019 Barnard et al.
2020/0193827 A1*  6/2020 Refsdal ............ G06F 18/24143
2020/0234589 A1*  7/2020 Mirlach .................. G01S 19/42
2020/0242924 A1*  7/2020 Publicover ............ G08G 1/087
2020/0312144 A1* 10/2020 Noguchi ................ G08G 1/143

OTHER PUBLICATIONS

Parkingrhino "Smart Parking Platform".
Thanh Nam Pham, et al. "A Cloud-Based Smart-Parking System Based on Internet-Of-Things Technologies" (Sep. 2015).

* cited by examiner

SYSTEMS AND METHODS FOR VIRTUAL PARKING LOT SPACE ALLOCATION

BACKGROUND

In some scenarios, vehicles may be required to navigate and/or park in a location with no parking markers, such as in a field for a concert, a construction site, at a tailgate party, etc. These scenarios may be associated with a number of challenges, such as determining where and how to park the vehicle, and coordinating egress and ingress with other vehicles to ensure each vehicle is able to optimally enter, park, and leave the parking location.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
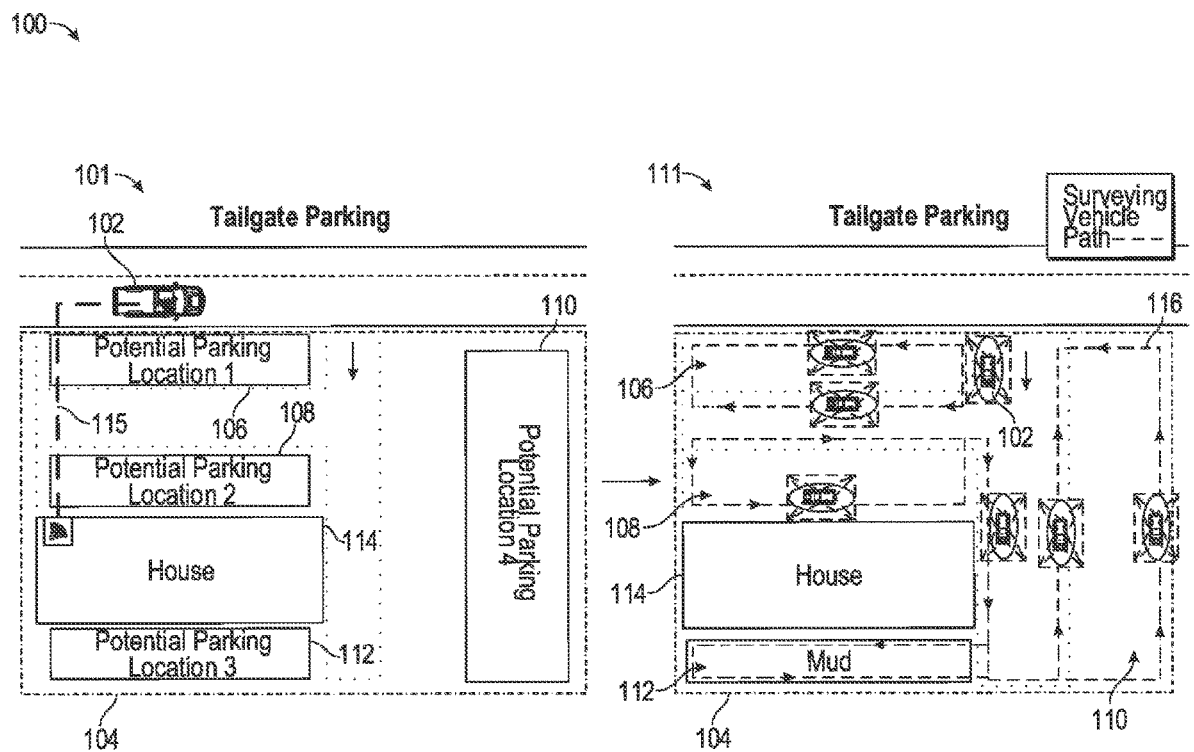
FIG. 1 illustrates an example use case, in accordance with one or more embodiments of the disclosure.

This disclosure relates to, among other things, systems and methods for virtual parking lot space allocation. In one or more embodiments, the system may leverage existing vehicle sensors in a "survey vehicle" (for example, a vehicle that is tasked with gathering data) to map a provided location in which vehicles are expected to park. These sensors may include any type of sensor that a vehicle may be equipped with (for example, ultrasonic sensors, temperature sensors, lidar, radar, cameras, etc.). This mapping may involve at least gathering data about the location, identifying portions of the location that are suitable for usage as vehicle parking spaces, and generating virtual parking spaces within those portions (among various other operations). Any reference herein to a survey vehicle performing any actions may similarly be performed by the remote system and/or infrastructure at the parking location as well. Additionally, tasks may be split amongst the survey vehicle, infrastructure, and/or remote system. For example, the survey vehicle may obtain data and the remote system may analyze the data and generate the virtual parking spaces.

In addition to performing the mapping, the survey vehicle (and/or remote system) may also determine single or multiple egress/ingress locations for the parking lot, and may optimize space claims in the location with respect to the sizes of expected vehicles (and additional space if needed). The survey vehicle may also provide other functionality as well, such as communicating information about the virtual spaces to the vehicles that are expected to park in these locations, providing direct route guidance to each parking space, and/or accepting forms of payment, if applicable. That is, even after the virtual parking spaces have been generated, the survey vehicle may still be used to manage the virtual parking lot.

As an example use case, an open field may be designated as a parking location for an event, but may not have existing parking space markers. A survey vehicle may be deployed to map the location prior to the location being used as the parking location for the event. The survey vehicle may gather data about the location, such as the types of terrain existing in certain portions of the designated location, objects that exist in the location, dimensions of the location, and/or any other types of data that may be useful for generating virtual parking lot allocations. Based on the data that is gathered, virtual parking spaces may then be generated within the parking location.

In one or more embodiments, the operations performed by the survey vehicle may include at least the following. The survey vehicle may first travel to a location that is designated for virtual parking assignment and assessment. A user managing the location of the designated parking location and/or infrastructure located at the general parking location (for example, using vehicle-to-infrastructure (V2I) communication) may indicate which portions of the parking location may potentially be used as parking spaces for vehicles. That is, in some situations, it may be pre-determined which portions of the parking location may potentially be used for parking. For example, a user may not necessarily desire for vehicles to park in a certain portion of a property and/or the terrain of the property may make it such that parking may be infeasible or impossible. These potential parking locations may be manually pre-determined by a user and provided to the survey vehicle and/or may be determined by infrastructure at the designated parking location and/or communicated to the survey vehicle by the infrastructure. When potential parking locations are provided, the survey vehicle may limit its mapping to those indicated potential parking locations because any other portions of the designed parking location are not going to be used for virtual parking spaces. However, in one or more embodiments, the survey vehicle may not necessarily be provided with any indication of potential parking spaces. In such cases, the entire designated parking location may initially be a potential parking space.

Additionally, in one or more embodiments, restrictions associated with the general parking location may also be communicated to the survey vehicle (for example, through V2I communication, or through instructions provided by the user. For example, such restrictions may involve particular portions of the general parking location where parking should not be allowed (for example, to prevent parking vehicles from impacting terrain in a given portion of the general parking location). Other examples of restrictions may include vehicle size and/or type restrictions, tailgating restrictions, camping restrictions, and/or any other limitations that may be placed on parking in the parking location. If no restrictions are applied, the entire general parking location may be used as a potential parking location. If long term storage is the goal (for example, maintaining the location as a general parking location for an extended period of time, a first-in first out parking method can be used with no egress lanes to mitigate theft at mass vehicle storage sites.

In one or more embodiments, the survey vehicle may arrive at the parking location, and may traverse one or more routes within the parking location to gather data about the parking location. This data may include any types of data, such as types of terrain, the existence of any objects, etc. If potential parking locations were provided to the survey vehicle, then the one or more routes may be limited to those potential parking locations. If potential parking locations were not provided to the survey vehicle, then the one or more routes may include any portion of the designated location and/or the entirety of the location. Depending on the property size and identified areas used for parking, multiple survey vehicles may also be used to survey the location as well.

In one or more embodiments, once the survey vehicle traverses the designated location and obtains any necessary data, virtual parking spaces may then be generated. In one or more embodiments, the survey vehicle itself may generate the virtual parking spaces. However, in one or more embodiments, the survey vehicle may simply gather data and provide the data to a remote system for analysis and generation of the virtual parking spaces. The virtual parking spaces may not necessarily be visible at the parking location itself. Rather, a user or a vehicle that reserves or is assigned a virtual parking space may be provided an indication of the location of the virtual parking space. Additionally, visual information about the virtual parking space may also be provided to the user and/or the vehicle in the form of a user interface (for example, a map of the parking location and the virtual parking spaces may be presented to a user. Additionally, technologies such as augmented reality may be used to project a virtual representation of the virtual parking space external to the vehicle, for example, to assist a user in parking within the virtual parking space. These visual representations may not necessarily be required, however, if the vehicle is autonomously parking within the virtual parking space.

Figure 2:
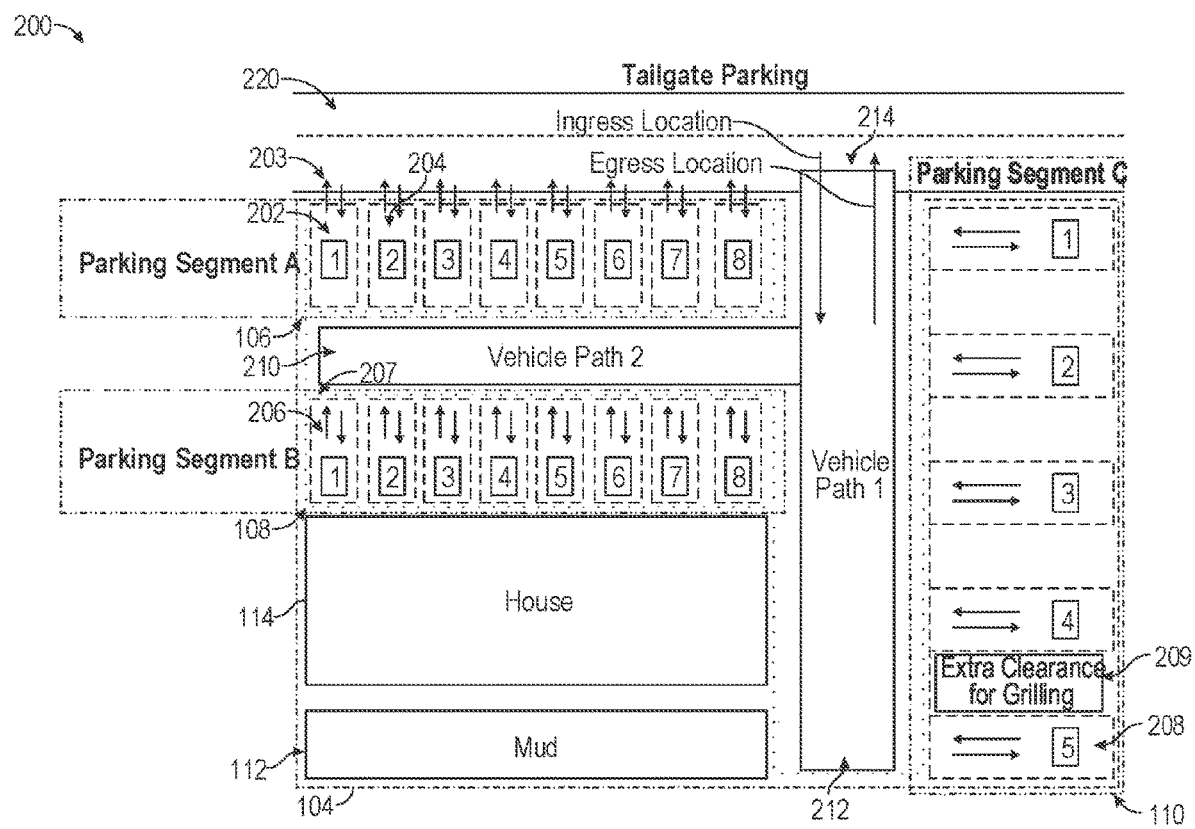
FIG. 2 illustrates an example use case, in accordance with one or more embodiments of the disclosure.

In some cases, the survey vehicle may identify available but distinct sections of parking space using "parking segments" (FIG. 2 provides an illustration of these "parking segments") which may be portions of the overall location. Parking segments may be created based on location, or they may be created based on specific criteria. A first example of such criteria may include spaces designated for only autonomous or semi-autonomous vehicles with remote-park or self-park capabilities. A second example of such criteria may include spaces designated for vehicles of certain sizes or types (for example, compact cars, large trucks, motorcycles, vehicles with off-roading capabilities, etc.). A third example of such criteria may depend on the purpose of the general parking location. For example, if the general parking location is to be used for holding vehicles for shipment, the arrangement of the virtual parking spaces may depend on a vehicle's final destination. A fourth example of such criteria may include a convenience factor, such as a distance to an event venue, a type of terrain, etc. A fifth example of such criteria may include a space with additional room activities, such as tailgating or camping. Any other number of examples may also be applicable as well.

In this manner, not all of the virtual parking spaces may necessarily be equally sized and spaced apart. For example, continuing the open field use case, one parking segment within the open field may be designed for virtual parking spaces for users that intend to camp at the parking location. Given these, the virtual parking spaces within this parking segment may be larger in size relative to other virtual parking spaces in other portions of the designated location. A second parking segment may be designated for motorbikes, so the virtual parking spaces in the second parking segment may be smaller and more closely spaced together.

In one or more embodiments, egress/ingress paths for the general parking location as a whole and/or egress/ingress paths for each individual virtual parking space may also be generated in additional to the virtual parking spaces themselves. Paths may be identified that may be used in conjunction with each parking space and/or each general egress/ingress location to ensure that each individual virtual space has a full path from the parking space to an entrance or exit of the general parking location. In some cases, egress/ingress routes may be parking space and/or path-specific to optimize flow of traffic and reduce congestion.

In one or more embodiments, the parking lot arrangement that is generated may vary based on one or more metrics that are desired to be optimized. Examples of such metrics may include, for example, vehicle capacity (e.g., fitting as many vehicles within the space as possible), maximizing space between vehicles, user convenience, etc. That is, the generation of the virtual parking spaces may not necessarily result in the same virtual parking lot configuration, even given the same location. For example, a first virtual parking lot may be generated for an event, where the first virtual parking lot is optimized for maximum vehicle capacity. A second virtual parking lot may then be generated on a subsequent day for the same event, where the second parking lot is optimized for maximum traffic flow through the parking lot. Additionally, the number of virtual parking spots and/or spacing between the virtual parking spots may differ in the first virtual parking lot and the second virtual parking lot. For example, it may be determined that larger vehicles will attend the event associated with the first virtual parking lot, and so a smaller number of larger virtual parking spaces may be generated. As a second example, it may be determined that more vehicles will be camping in the first virtual parking lot, which may also result in a smaller number of larger parking spaces.

Figure 7:
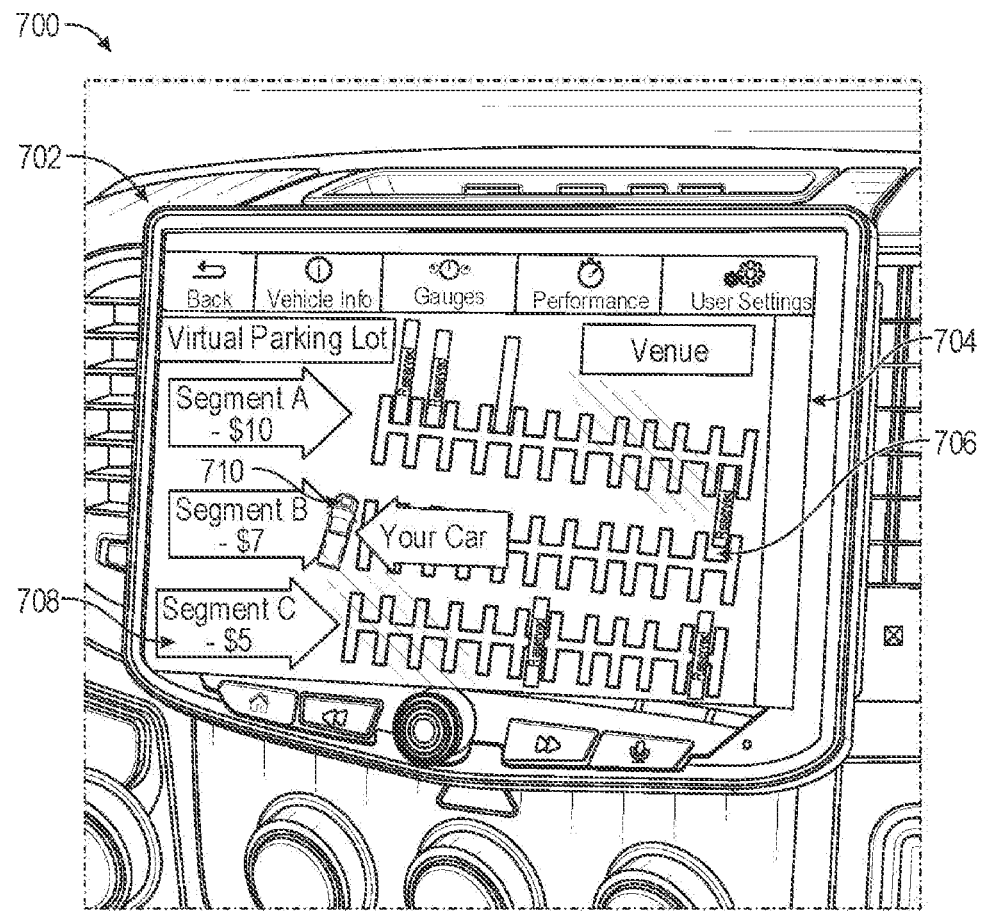
FIG. 7 illustrates an example user interface, in accordance with one or more embodiments of the disclosure.

In one or more embodiments, once the parking lot arrangement is determined, any generated virtual parking spaces may be made available for usage. In some cases, vehicles and/or users may reserve virtual parking spaces. In some cases, virtual parking spaces may be automatically assigned to vehicles. In some cases, a combination of manual reservations and automatic assignments may be performed. In the case of manual reservations, a user may be able to make a virtual parking space reservation in any number of different ways, such as through a website, mobile phone application, vehicle human machine interface (HMI) (for example, as shown in FIG. 7), and/or any other method. A reservation user interface may provide indications of spots that are available and spots that are already reserved. The user interface may also provide information about individual spots, such as pricing, distance to venue, parking space size, etc.

Additionally, in some cases, users may request a reservation even prior to the generation of the virtual parking spaces. In such situations, this information may be used to assist in the generation of the virtual parking spaces. For example, as mentioned above, if it is determined that a number of larger vehicles have reserved parking spaces in the virtual parking lot, then a larger number of large parking spaces may be generated in the virtual parking lot than if smaller vehicles were determined to have reserved the parking spaces. Further, if the users will be observing the event from their vehicles, the system may generate virtual parking spaces with the largest (e.g. tallest) vehicle behind the small vehicle relative to the direction of the stage to allow all users to have a good line of sight for the event.

In one or more embodiments, certain virtual parking spaces may be associated with specific reservation rules. For example, virtual parking spaces closer to an entrance or exit of the parking location may be reserved for vehicles requiring extra time and/or special assistance. Additionally, pricing may vary depending on the location and/or type of parking space. For example, spots closer to a venue entrance and wider spots for vans or large trucks may be priced higher. Discounts could also be offered to vehicles with perimeter video capability and cloud transmit for help monitoring lot.

In one or more embodiments, once the virtual parking spaces have been assigned to various vehicles, information about the reservations may be communicated to the vehicles. Such information, for example, may include the location of the parking space, a path to and from the parking space from an entrance and/or exit of the virtual parking lot, egress/ingress locations, and/or any other types of relevant information. Such information may also be shared with vendors at the event so that vehicles may order food or beverages to be delivered to their parking site. In some cases, route navigation may be provided to the vehicles to indicate the particular route a vehicle should take from an entrance of the parking location to their designated virtual parking space. Virtual lines may be presented to a user within through an HMI of the vehicle as to provide information to driver of how to orient vehicle even though physical parking markers do not exist. When arriving at the event, in the absence of parking lines, a vehicle's heads-up display (HUD), if equipped, can be used to overlay the parking lines onto the terrain.

In one or more embodiments, the vehicle may park manually or through any semi-autonomous and/or fully-autonomous methods. The vehicle may also report issues as needed. For example, the vehicle may indicate a change in terrain associated with the virtual parking space that makes parking difficult or impossible (e.g., rains resulted in large puddles or flooding of lowland). The vehicle may also provide any other information. The information may be provided to the survey vehicle and/or infrastructure at the parking location. If the vehicle has autonomous capabilities, parking may also be performed by dropping the user off at a specific location and then continuing to the reserved parking spot via autonomous parking systems. If autonomous parking systems are used, Bluetooth communication can let the vehicle be parked/autonomously controlled while the driver is nearby. The autonomous parking systems may also leverage cellular communication which would enable driver assisted autonomous parking from further distances. Virtual parking spaces may be geofenced so that the parking space may only be used by the user that reserves the parking space.

For vehicles with limited GPS accuracy and/or less sensor capabilities to help the vehicle identify the correct parking location, parking assistance may be provided. For example, the surveying vehicle may assist these vehicles park by acting as a guide and providing instructions via vehicle-to-vehicle (V2V communication (and/or any other type of communications). This may be accomplished, for example, by comparing relative vehicle locations to key reference points and/or other vehicles to ensure the proper orientation is accomplished. Surrounding vehicles may also use sound exciters (and/or other indications) to communicate the appropriate relative location and spacing. Additionally, ultra-wide band (UWB) and/or Bluetooth low energy (BLE) communication using more basic sensors such as ultrasonics and/or cameras without image recognition may be used to hand off identification of proper arrangements using cloud computing. A virtual parking space can be blocked from any other user by providing a virtual indication on an HMI of the vehicle (for example, a red "x" or flashing "not allowed to park here."

In one or more embodiments, the survey vehicle may continue to manage the parking location even after the virtual parking spaces are generated. For example, the survey vehicle may traverse the parking location and monitor the virtual parking spaces to ensure the parked vehicles are all in the correct orientations and are within their vehicle specified space claims. This may be accomplished by cross-referencing the vehicle identification to the reserved parking spot using the existing sensor suite and identifying anomalies. This may also be accomplished using any other suitable methods. The survey vehicle may continue to traverse the parking location and capture information about vehicles parked in various virtual parking spaces. For example, the survey vehicle may capture and analyze license plate information using cameras and computer vision techniques, may obtain reservation information from vehicles using V2V communications, and/or may manage the parking lot using any other similar methods. These monitoring operations may also be performed without using the survey vehicle. For example, infrastructure at the parking location may be used for monitoring purposes as well.

In one or more embodiments, the survey vehicle may also identify and/or correct issues within the parking lot. If a vehicle is identified as being improperly parked within a virtual parking space, then the survey vehicle may attempt to remedy the improper parking situation. For example, if the vehicle is in simply over a virtual boundary line of the virtual parking space, the survey vehicle may communicate to the vehicle information about when and how to re-orient itself to alleviate the issue. If the vehicle has no record of having reserved and/or been assigned the virtual parking space, the vehicle may be towed as communicated and arranged by the surveying vehicle. If the vehicle is simply in the wrong spot, the vehicle may be directed to move to the correct parking space. If the vehicle cannot move due to the lack of autonomous driving capabilities, a user associated with the vehicle may then be charged a fee and/or the vehicle may be towed. The other vehicle whose spot was taken may then be allocated a different spot. Illustrations of use cases relating to parking location monitoring may be provided in at least FIGS. 5-6.

The systems and methods described herein may be associated with a number of advantages. A main advantage may include the capability to generate and manage virtual parking lots in areas that do not already have parking space markers. This may allow for virtual parking lots to be created and managed for varying use cases and in varying types of environments. For example, in contrast with a parking lot with permanent parking lot markers, the virtual parking lot spaces may be adjusted in size and location to meet the needs of the specific use case. These virtual parking lots may also not need to be permanent locations, and can be reverted back to the original terrain once the parking lot is no longer needed. Additionally, the virtual parking lots may be organized such that the flow of traffic within the parking lot is optimized (the egress/ingress paths within the virtual parking lot may be optimized).

FIG. 1 illustrates an example use case 100, in accordance with one or more embodiments of the disclosure. The use case 100 may illustrate a scenario where a survey vehicle 102 traverses a designated parking location 104 to gather data about the location for purposes of generating one or more virtual parking spaces (shown in FIG. 2).

In one or more embodiments, first scene 101 of the use case 100 illustrates a survey vehicle 102 traveling towards the designated parking location 104. The designated parking location 104 may include one or more potential parking segments (for example, potential parking segment 106, potential parking segment 108, potential parking segment 110, potential parking segment 112, and/or any other number of potential parking segments). These potential parking segments may be pre-determined portions of the designated parking location 104 in which virtual parking spaces may be created. These potential parking segments may be manually pre-determined by a user and provided to the survey vehicle 102 and/or may be determined by infrastructure (for example, the house 114) at the designated parking location 104 and/or communicated to the survey vehicle by the infrastructure.

Following the scene 101, the scene 111 illustrates the survey vehicle 102 traversing the designated parking location 104 to gather data about the designated parking location 104. For example, the survey vehicle 102 may traverse the designated parking location 104 using one or more routes 116. The one or more routes 116 may be automatically determined (for example, the survey vehicle 104 may be an autonomous vehicle) or a driver of the survey vehicle 104 may manually drive the survey vehicle 102 along the routes 116. In one or more embodiments, the one or more routes 116 may be determined based on the pre-determined potential parking locations. For example, the one or more routes 116 may be determined such that the survey vehicle 102 may traverse all of the potential parking locations to gather data about the potential parking locations. In one or more embodiments, the one or more routes 116 may also include other portions of the designated parking location 104, such as potential ingress and egress routes. Additionally, in some scenarios, potential parking locations may not be provided to the survey vehicle 102. That is, the designated parking location 104 may be provided to the survey vehicle 102, but potential parking locations may not necessarily be pre-determined. In such cases, the entire designated parking location may initially be a potential parking space, and the survey vehicle 102 may not be limited to particular portions of the parking location.

In one or more embodiments, as the survey vehicle 102 traverses the one or more routes 116, the survey vehicle 102 may gather a number of different types of data about the designated parking location 104. For example, the survey vehicle 102 may determine types of terrain at different portions of the designated parking location 104. The survey vehicle 102 may also determine a current condition of the terrain (for example, if it recently rained and a portion of the designated parking location 104 is muddy). The survey vehicle 102 may also determine if any objects exist in any portions of the designated parking location 104. The survey vehicle 102 may also gather any other types of data about the designated parking location 104, such as elevations of certain portions of the designated parking location 104, dimensions of the designated parking location 104 and/or particular portions of the designated parking location 104, as well as any other types of information. This data may be gathered using any types of sensors that a vehicle may be equipped with (for example, ultrasonic sensors, temperature sensors, lidar, radar, cameras, etc.). The data may also be supplemented by data captured by infrastructure within or nearby the designated parking location 104. For example, as illustrated in the figure, a house 114 may be located within the designated parking location 104. The house may also use its own sensors to capture data about the designated parking location 104. Additionally, since the house is already at the designated parking location 104, the house 114 may have previously captured such data. In such cases, the house 114 may provide the information to the survey vehicle 102 and/or a remote system. For example, the figure illustrates the house providing this information to the survey vehicle 102 through V2I communications. The house 114 may also provide any other types of information to the survey vehicle 102, such as any pre-determined parking segments (if applicable), as well as any other types of information.

FIG. 2 illustrates an example use case 200, in accordance with one or more embodiments of the disclosure. The use case 200 illustrates the generation of virtual parking spaces (for example, virtual parking space 202, virtual parking space 204, virtual parking space 206, virtual parking space 208, and/or any other number of virtual parking spaces) as well as egress/ingress paths for the virtual parking lot as a whole (for example, vehicle path 210, vehicle path 212, and/or any other number of vehicle paths) and individual virtual parking spaces (for example, vehicle path 203, vehicle path 207, and/or any other number of vehicle paths).

Once the survey vehicle traverses the designated location 104 and obtains any necessary data, virtual parking spaces may then be generated. In one or more embodiments, the survey vehicle itself may generate the virtual parking spaces. However, in some cases, the survey vehicle may simply gather data and provide the data to a remote system for analysis and generation of the virtual parking spaces (for example, infrastructure located at the parking location 104 and/or a remote server).

The virtual parking spaces may not necessarily be visible at the parking location itself. Rather a user or a vehicle that reserves or is assigned a virtual parking space may be provided an indication of the location of the virtual parking space. Additionally, visual information about the virtual parking space may also be provided to the user and/or the vehicle in the form of a user interface (for example, a map of the parking location and the virtual parking spaces may be presented to a user). Additionally, technologies such as augmented reality may be used to project a virtual representation of the virtual parking space external to the vehicle, for example, to assist a user in parking within the virtual parking space. These visual representations may not necessarily be required, however, if the vehicle is autonomously parking within the virtual parking space.

In one or more embodiments, the virtual parking space generation may involve identifying distinct sections of parking space (for example, parking segment 106, parking segment 108, parking segment 110, and/or any other number of parking segments) which may be portions of the overall parking location 104. Parking segments may be created based on location, or they may be created based on specific criteria. A first example of such criteria may include spaces designated for only autonomous or semi-autonomous vehicles with remote-park or self-park capabilities. A second example of such criteria may include spaces designated for vehicles of certain sizes or types (for example, compact cars, large trucks, motorcycles, vehicles with off-roading capabilities, etc.). A third example of such criteria may depend on the purpose of the general parking location. For example, if the general parking location is to be used for holding vehicles for shipment, the arrangement of the virtual parking spaces may depend on a vehicle's final destination. A fourth example of such criteria may include a convenience factor, such as a distance to an event venue, a type of terrain, etc. A fifth example of such criteria may include a space with additional room activities, such as tailgating or camping.

In this manner, not all of the virtual parking spaces may necessarily be equally sized and spaced apart. For example, FIG. 2 depicts three individual parking segments. Parking segment 106 includes example virtual parking space 202 and virtual parking space 204 (as well as a number of additional virtual parking spaces), and parking segment 108 includes example virtual parking space 206 (as well as a number of additional virtual parking spaces). Parking segment 110 includes virtual parking space 208 (as well as a number of additional virtual parking spaces). In some cases, some or all of the parking segments may include similar types of virtual parking spaces. For example, the virtual parking spaces generated for the parking segment 106 and the parking segment 108 may be virtual parking spaces for compact vehicles, and may include virtual parking spaces of similar size and equal spacing apart from one another. However, the parking segment 110 may be intended for larger parking spaces, which may either accommodate larger vehicles, and/or vehicles in addition to space for other activities. For example, the virtual parking space 208 may account for additional space 209 for camping activities. Although the figure only depicts three parking segments of two different types, any other number of parking segments accommodating different numbers and/or types of vehicles may also be included within a parking location 104. Furthermore, in some situations, all of the virtual parking spaces may be the same size. Additionally, the generation of the virtual parking spaces may not necessarily involve parking segments, but rather may involve generation of individual parking spaces.

Additionally, in one or more embodiments, some portions of the parking location 104 may be identified as being non-parking areas. These determinations may be made for any number of reasons. For example, as illustrated in the figure, the parking segment 112 may have been determined to be a muddy portion of the parking location 104. With this being the case, the parking segment 112 may not be provided with virtual parking spaces. In some cases, however, the parking segment 112 may instead be provided with virtual parking spaces, but only usable by vehicles with off-roading capabilities. In this manner, vehicles without off-roading capabilities may not be able to reserve the virtual parking spots associated with the parking segment 112, and/or only such vehicles may be automatically assigned to the parking segment 112.

In one or more embodiments, egress/ingress paths for the general parking location as a whole and/or egress/ingress paths for each individual virtual parking space may also be generated in addition to the virtual parking spaces themselves. Paths may be identified that may be used in conjunction with each parking space and/or each general egress/ingress location to ensure that each individual virtual space has a full path from the parking space to an entrance or exit of the general parking location.

As depicted in the figure, vehicle path 210 and vehicle path 212 may be generated as general egress/ingress paths on which vehicles may traverse the parking location 104. Additionally, a specific egress/ingress location for the parking lot 214 may be generated to direct the flow of traffic to one entrance/exit location. Additionally, each individual virtual parking space may also be provided its own egress/ingress location. For example, the virtual parking spaces associated with the parking segment 106 may include designated egress/ingress locations associated with a road 220 that is external to the parking location 104. The virtual parking spaces associated with the parking segment 108 may include designated egress/ingress locations associated with the vehicle path 210 within the parking location 104. These specific vehicle paths and/or egress/ingress locations may be generated so as to optimize the flow of traffic and reduce congestion within and around the parking location 104.

Figure 3:
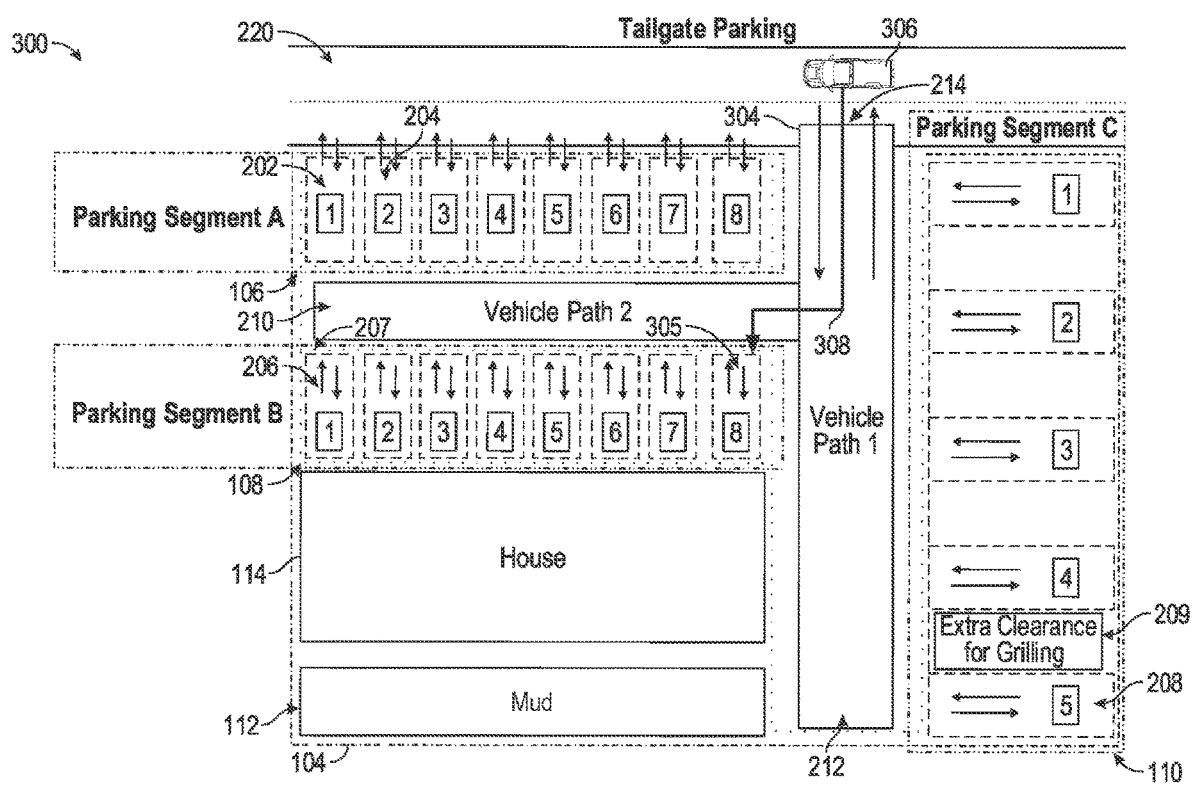
FIG. 3 illustrates an example use case, in accordance with one or more embodiments of the disclosure.

FIG. 3 illustrates an example use case 300, in accordance with one or more embodiments of the disclosure. The use case 300 illustrates assistance provided to a vehicle 306 in navigating to a virtual parking space 305 reserved by the vehicle 306 (and/or automatically assigned to the vehicle 306).

In one or more embodiments, once a virtual parking space has been reserved by a user or automatically assigned to a user, instructions may be provided to the user for navigating to the virtual parking space. For example, as illustrated in the figure, the vehicle 306 may have reserved (and/or automatically been assigned) virtual parking space 305. In some instances, the instructions may be provided to a device of a user, such as a mobile device with navigation capabilities. In some instances, the instructions may be provided to the user in the form of a navigation route that is transmitted to a navigation system of the vehicle 306. In this manner, the vehicle 306 may navigate the parking location 104 automatically without the user needing to manually drive the vehicle 306 (for example, if the vehicle is an autonomous vehicle that self-parks in the virtual parking space 305). The instructions may be provided to the user and/or the vehicle 306 prior to the vehicle 306 arriving at the parking location 104. However, the instructions may also be provided to the user and/or the vehicle 306 upon arrival at the parking location 104. The instructions may also be provided to the user and/or the vehicle 306 when the vehicle 306 is a threshold distance away from the parking location 104. The instructions may also be provided at any other time and in any other manner as well.

In one or more embodiments, the instructions may provide a specific route 304 for the vehicle 306 to traverse in order to reach the virtual parking space 305. The route 304 may include a specific location at which the vehicle 306 should enter the parking location 104. The route 304 may also indicate a particular path for the vehicle 306 to take once the vehicle 306 is within the parking location 104. For example, the route 304 indicates that the vehicle 306 should enter at ingress location 308, traverse a first vehicle path 212, traverse a second vehicle path 210, and park in the virtual parking space 305. The instructions may also provide an indication of a specific direction from which the vehicle should enter the virtual parking space. For example, the virtual parking space 202 may be accessible from the road 220 external to the parking location 104 or from the second vehicle path 210. However, as indicated in the figure, a vehicle parking in the virtual parking space 202 may receive instructions to enter the virtual parking space 202 from the road 220, rather than from the second vehicle path 210. These specific routing instructions may be intended to optimize the flow of traffic through and around the parking location 104. The instructions may also indicate a manner in which the vehicle 306 should park in the virtual parking space 305. For example, the instructions may indicate that the vehicle 304 should reverse into the virtual parking location 306, should park closer to one side of the virtual parking 306 space to allow additional room on one side of the vehicle 304 for a vehicle in an adjacent virtual parking space, etc. The instructions may also include any other information relevant to the user and/or the vehicle 306 in navigating the parking location 104 and parking the vehicle 306.

Figure 4:
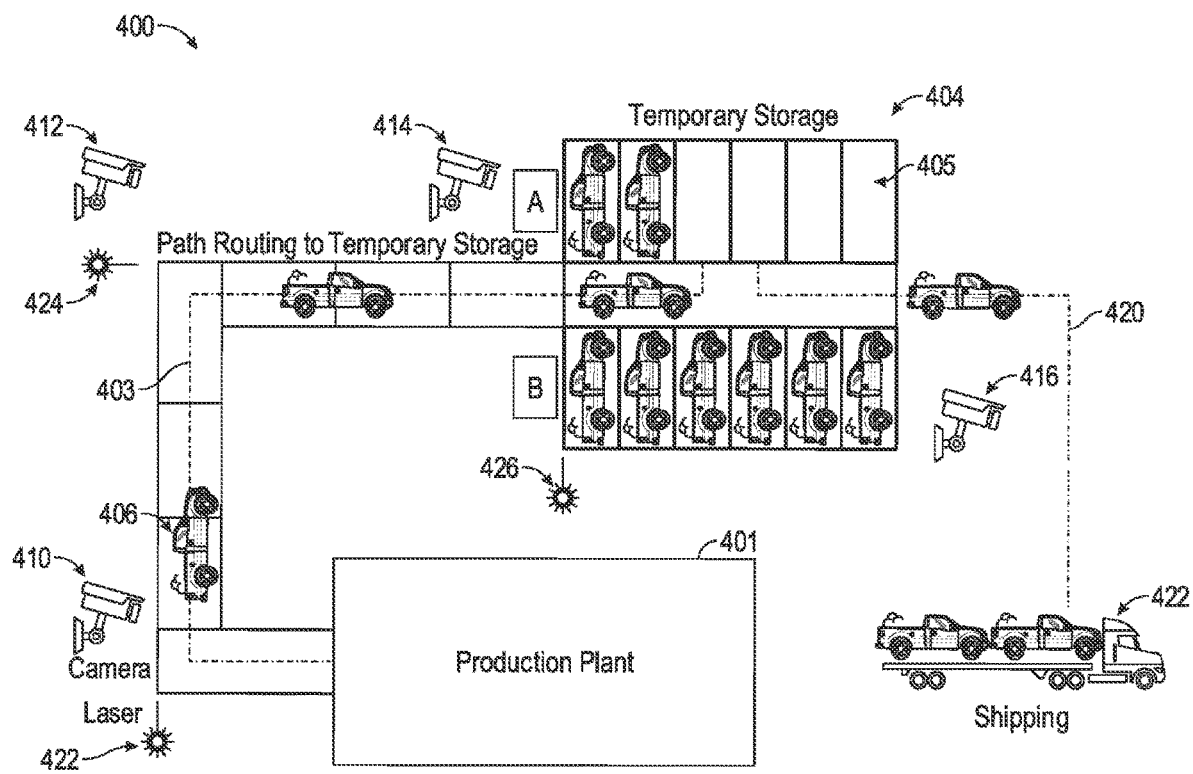
FIG. 4 illustrates an example use case, in accordance with one or more embodiments of the disclosure.

FIG. 4 illustrates an example use case 400, in accordance with one or more embodiments of the disclosure. The use case 400 may illustrate another type of use case involving storage of vehicles manufactured at a production plant before they are shipped to a final destination (e.g., dealership, private customer, etc.).

Particularly, the use case 400 may involve the creation of a virtual parking lot 404 that may be used as a temporary storage location for vehicles produced by the production plant 401. In this manner, the virtual parking lot 404 may be generated based on the types and/or numbers of vehicles being produced. For example, if a production cycle is performed for larger trucks, a virtual parking lot 404 may be produced that has larger virtual parking spaces 405 to accommodate those trucks.

In one or more embodiments, the use case 400 may involve at least the following. First, a vehicle 406 may be produced by the production plant 401. The vehicle 406 may be provided instructions including a route 403 that the vehicle may take to the virtual parking lot 404. As aforementioned, in some instances, the instructions may be provided to a device of a user, such as a mobile device with navigation capabilities. In some instances, the instructions may be provided in the form of a navigation route that is transmitted to a navigation system of the vehicle. The vehicle 406 may either be manually driven to the virtual parking lot 404, or the vehicle may autonomously navigate to the virtual parking lot 404 using the route 403 (for example, if the vehicle has semi-autonomous or autonomous capabilities). Second, the vehicle 406 may park within a virtual parking space (for example, virtual parking space 405 and/or any other virtual parking space) within the virtual parking lot 404. The vehicle 406 may then remain in the virtual parking lot 404 until instructed to proceed to a shipment location 422. In such cases, a second route 420 may be provided to a user and/or the vehicle 406 itself to allow the vehicle 406 to navigate from the virtual parking lot 404 to the shipment location 422.

In one or more embodiments, one or more sensors (for example, camera 410, camera 412, camera 414, camera 416, laser 422, laser 424, and/or laser 426, as well as any other number and or types of sensors) may also be used to obtain data about any of the elements of the use case 400. For example, the sensors may be used to track the progression of any vehicles through any of the routes, a number of vehicles stored in the parking lot 404, the specific virtual parking spaces 405 that are occupied in the parking lot, etc.

This use case 400 may serve to illustrate that the virtual parking lot generation and management as described herein may be applied to any context.

Figure 5:
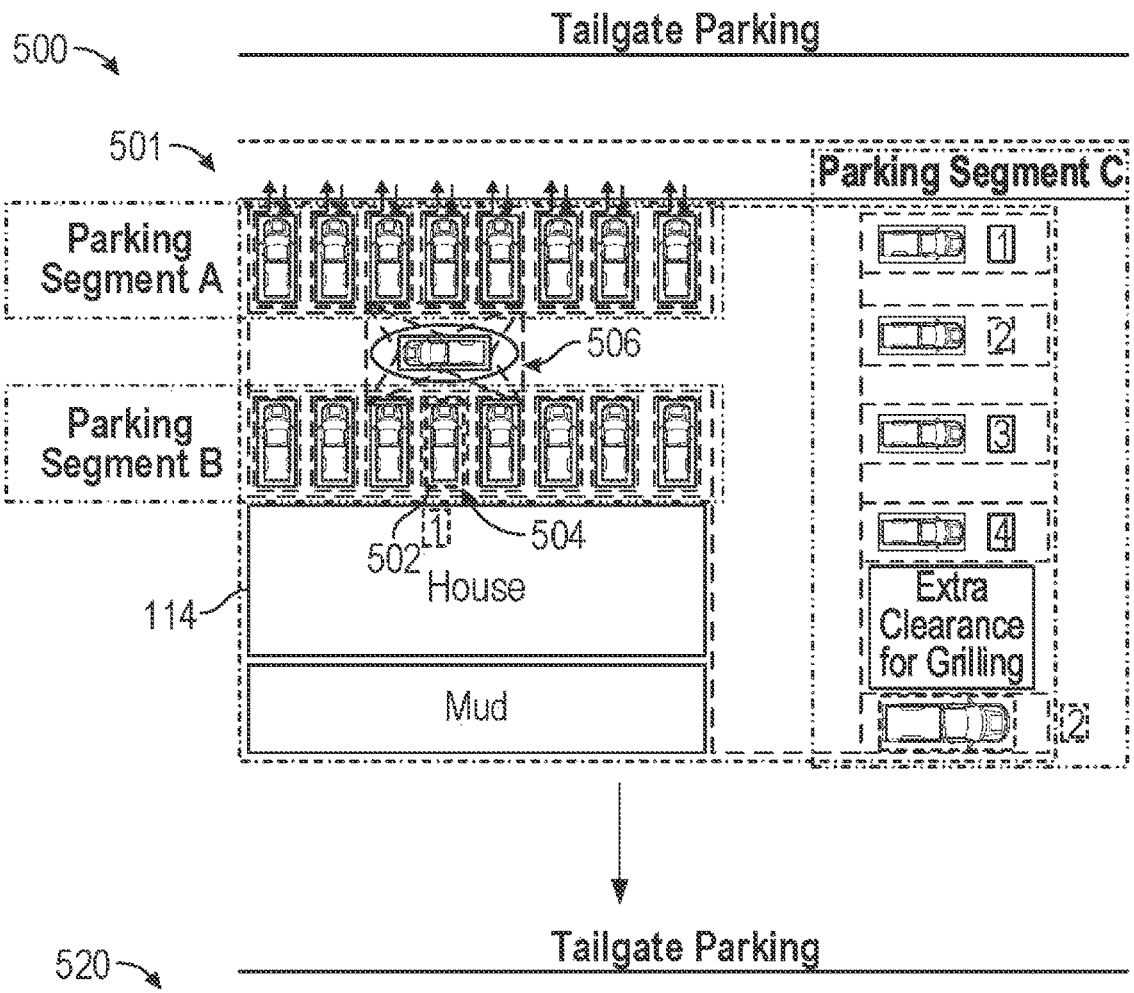
FIG. 5 illustrates an example use case, in accordance with one or more embodiments of the disclosure.
Figure 5:
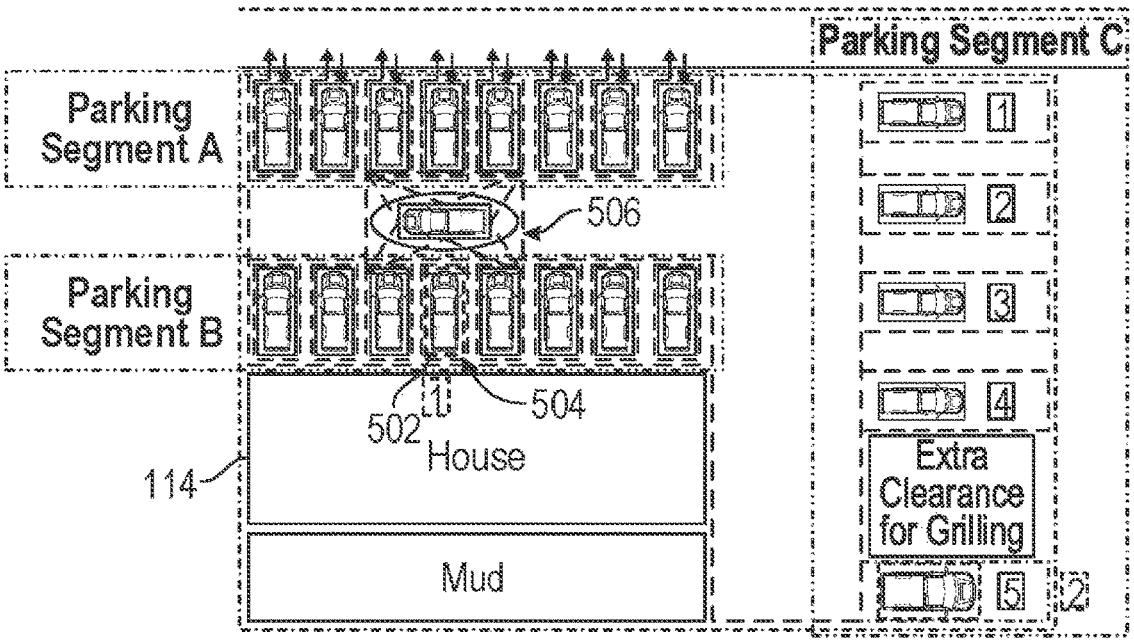

FIG. 5 illustrates an example use case 500, in accordance with one or more embodiments of the disclosure. The use case 500 illustrates an example of management of the parking location 104 after the mapping of the parking location 104 has been performed and the virtual parking spaces have been generated.

In one or more embodiments, the use case 500 depicts a first scene 501 in which a vehicle 502 has improperly parked within a virtual parking space 504. That is, the vehicle 502 is parked too closely to one side of the virtual parking space 504 (or outside of the boundaries of the virtual parking space 504). This is merely one example of improper parking by a vehicle, and any other types of improper parking may also be applicable as well. This improper parking of the vehicle 502 may be identified, and an indication may be provided for the vehicle 502 to remedy the improper parking. For example, an indication may be provided to a mobile device of a user to re-park the vehicle within the virtual parking space 504. Alternatively, if the vehicle has semi-autonomous or autonomous capabilities, the vehicle 502 itself may be instructed to re-park within the boundaries of the virtual parking space 504.

In one or more embodiments, the identification of the improper parking may be performed through any suitable methods. As one example, images and/or video may be captured and computer vision processing may be performed on the images and/or videos. As a second example, the survey vehicle may request identification from a parked vehicle using V2V communications (and/or any other types of communications). The identification may also be performed using any other suitable methods.

In one or more embodiments, the indication may be provided to the vehicle 502 through any number of different methods. As one example, the parking location 104 may be managed by the survey vehicle 506 that initially mapped the parking location 104. That is, the survey vehicle 506 may remain within the parking location 104 and may monitor virtual parking spaces and/or vehicles within the parking location. The parking location 104 may also be monitored using other types of systems, however, such as infrastructure associated with the parking location 104. For example, the house 114. The indication may be provided through any method of communication, such as V2V, V2I, cellular, Wi-Fi, and/or any other type of communication.

In one or more embodiments, during this parking lot management phase, the survey vehicle 506 may also continue to obtain data about the parking location 104. For example, the survey vehicle may provide information about a number of vehicles that are currently within the parking location 104, whether any virtual parking spaces that have been reserved or assigned remain unclaimed, whether any problems arise with terrain within the parking location 104 that may require the virtual parking spaces to be adjusted, and/or any other types of data that may be relevant to the parking location 104. This data may also be obtained from the infrastructure at the parking location 104, other vehicles at the parking location 104, and/or through any other system.

The use case 500 also depicts a second scene 520. The second scene 520 illustrates the vehicle 502 as having re-parked within the virtual parking space 504, so that the vehicle 502 is now properly parked within the virtual parking space 504. When this is the case, the survey vehicle 506 may confirm that the vehicle is 502 now properly parked, and may continue to monitor the remainder of the parking location 104. The survey vehicle 506 may also provide a confirmation that the vehicle 502 is properly parked to the vehicle 502 and/or any other relevant systems. The determination that the vehicle 502 has been properly parked may also be made by any other system that may make such determination as described above, such as infrastructure in the parking location 104.

Figure 6:
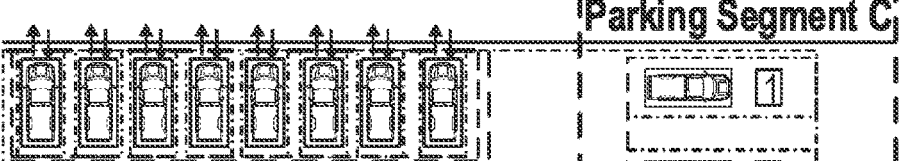
FIG. 6 illustrates an example use case, in accordance with one or more embodiments of the disclosure.
Figure 6:
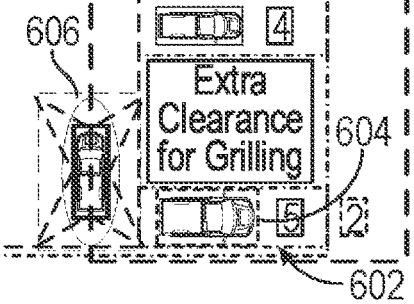
Figure 6:
Figure 6:
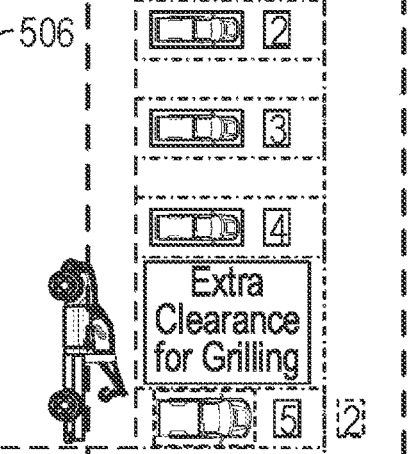

FIG. 6 illustrates an example use case 600, in accordance with one or more embodiments of the disclosure. Similar to use case 500, use case 600 illustrates another example of management of the parking location 104 after the parking location 104 has been generated. The use case 600 includes a scene 601 in which a survey vehicle 606 is monitoring the parking location (as aforementioned, the survey vehicle 506 may not necessarily be performing the monitoring, and the description provided with respect to this figure, as well as any other figure described herein, may similarly apply to any other system that performs the monitoring, such as infrastructure). The survey vehicle 506 may identify that a virtual parking space 602 is improperly occupied by a vehicle 604 that is not assigned to that virtual parking space 602. Based on this determination, the survey vehicle 606 may take a number of different actions. For example, the survey vehicle 606 may send a request for the vehicle 604 to exit the virtual parking space 602. The survey vehicle 606 may also send an alert to a remote system, such as a towing service, to physically remove the vehicle 604 from the virtual parking space 602 if the vehicle is unable to be otherwise removed from the virtual parking space 602 (as illustrated in scene 620).

FIG. 7 illustrates an example user interface 700, in accordance with one or more embodiments of the disclosure. The user interface 700 may be used for a number of different purposes.

In one or more embodiments, the user interface 700 may be used to allow a user to reserve a particular virtual parking spot in a parking location. For example, in some instances, a user may manually reserve a virtual parking space. The user interface 700 may provide a system by which this may be accomplished. To accommodate this, the user interface 700 may present a map of the parking location (for example, parking location 704), including indications of virtual parking spaces (for example, virtual parking space 706) that are available and virtual parking spaces that are already reserved. The user interface may also provide information about individual spaces, such as pricing, distance to the venue, parking space size, etc. The user may be able to select a virtual parking space to request a reservation of the virtual parking space. The user may also be able to obtain additional information about the virtual parking space upon selection of the virtual parking space. The user interface 700 may also present any other types of relevant information and allow the user to interact with the map and/or perform any other actions with respect to the parking location 704 in any other manner. Although depicted as being presented on a human-machine interface (HMI) 702 of a vehicle, the user interface 700 may similarly be presented through any other system or device, such as a smartphone of the user, for example.

In one or more embodiments, the user interface 700 may also be used to assist a user when they arrive at the parking location 704. For example, the user interface 700 may provide a map of the parking location 704, including an indication of the virtual parking space 706 that the user reserved and/or was assigned, and may provide navigation instructions to the user. For example, the user interface 700 may indicate a location of the vehicle 710 of the user relative to the parking location 704, and may provide a navigation route and navigation instructions on how specifically the user should traverse the parking location 704 and park the vehicle 710 in the virtual parking space 706. As aforementioned, in some cases, a user may not be involved in the virtual parking space assignment process or even the parking lot 704 navigation process. That is, a virtual parking space may be automatically assigned to a vehicle in some cases, and the vehicle may automatically navigate the parking lot 704 and automatically park the vehicle in the virtual parking space 706 (for example, if the vehicle has semi-autonomous or autonomous capabilities). Even in such cases, however, the user may still be present within the vehicle 710, and the user interface 700 can still present information to the user as the vehicle 710 autonomously navigates and parks.

Figure 8:
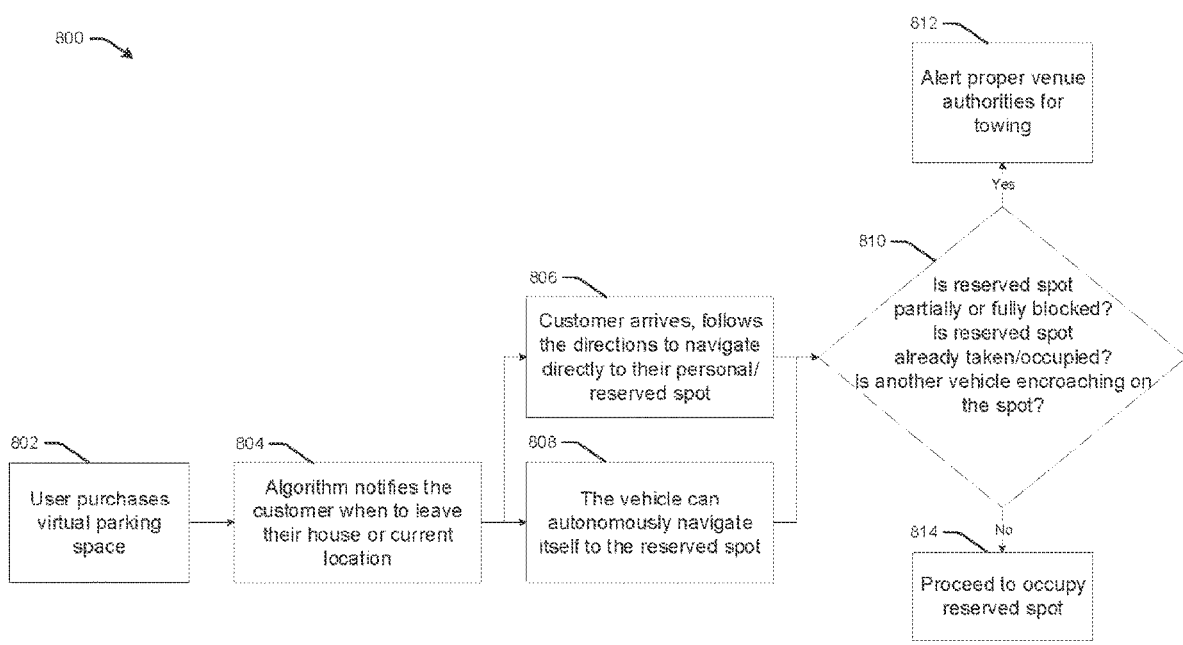
FIG. 8 illustrates an example flow diagram, in accordance with one or more embodiments of the disclosure.

FIG. 8 illustrates another example flow diagram 800, in accordance with one or more embodiments of the disclosure.

In one or more embodiments, the flow diagram 800 may begin with operation 802, which may involve a customer purchasing a virtual parking space. In some cases, a user may purchase a specific virtual parking space. In some cases, a user may purchase a type of virtual parking space, but not a specific virtual parking space. For example, a user may purchase a virtual parking space including a campsite. In such cases, the user may be assigned one of the virtual parking spaces including a campsite.

Operation 802 may be followed by operation 804, which may involve providing a notification to the user as to when they should proceed to the virtual parking location. Operation 804 may be followed by either operation 806 or operation 808 depending on the capabilities of the vehicle. If the vehicle does not have autonomous capabilities, then operation 804 may be followed by operation 806, which may involve the user following navigation directions to their reserved or assigned virtual parking space. If the vehicle has autonomous capabilities, then operation 804 may be followed by operation 808, and the vehicle may autonomously navigate itself to the reserved or assigned virtual parking space.

Operations 806 and 808 may be followed by condition 810. Condition 810 may involve determining if the virtual parking space is partially or fully blocked and/or already occupied. If so, condition 810 may be followed by operation 812, which may involve sending an alert that the virtual parking space is partially or fully blocked and/or already occupied. If not, then condition 810 may be followed by operation 814, which may involve the vehicle proceeding to occupy the reserved or assigned virtual parking space.

Figure 9:
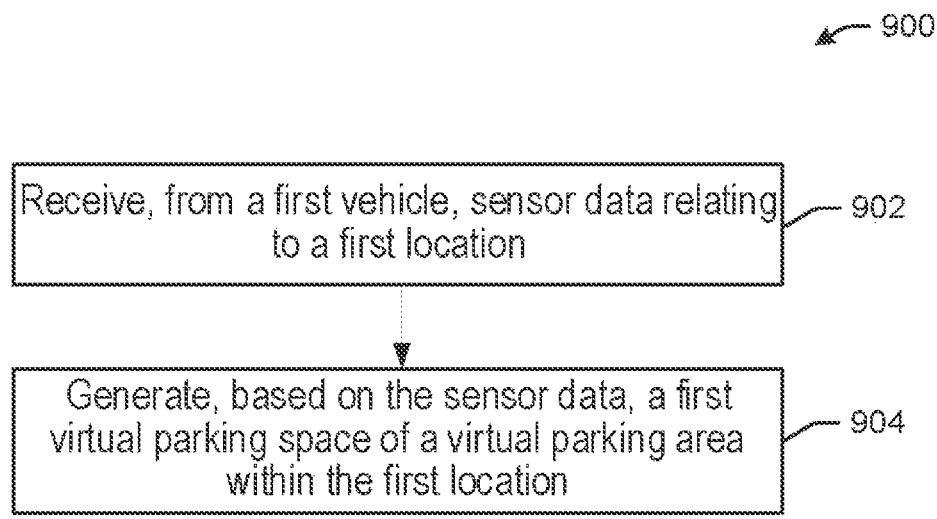
FIG. 9 illustrates an example method, in accordance with one or more embodiments of the disclosure.

FIG. 9 illustrates an example method 900, in accordance with one or more embodiments of this disclosure. At block 902, the method 900 may include receiving, from a first vehicle, sensor data relating to a first location. At block 904, the method 900 may include generating, based on the sensor data, a first virtual parking space of a virtual parking location within the first location.

In one or more embodiments, the method 900 may also include generating, based on the sensor data, a second virtual parking space within the first location, wherein the second virtual parking space is a different type of parking space than the first virtual parking space.

In one or more embodiments, the method 900 may also include receiving, from the first vehicle, an indication that a first portion of the first location is a non-parking portion, wherein the first virtual parking space is generating in a second portion of the first location based on the indication.

In one or more embodiments, the method 900 may also include sending, to the first vehicle and prior to receiving the sensor data, an indication that a third portion of the first location is a potential parking location, wherein the sensor data is captured by the first vehicle along a route within the second portion.

In one or more embodiments, the method 900 may also include receiving, from the first vehicle, a virtual egress or ingress path through the virtual parking location.

In one or more embodiments, the method 900 may also include receiving, from a second vehicle, a request to reserve the first virtual parking space or automatically assign the virtual parking space to the second vehicle.

In one or more embodiments, the method 900 may include receiving, from the first vehicle, an indication that a third vehicle is improperly parked within a third virtual parking space within the virtual parking location. The method 900 may also include sending, to the third vehicle, an indication to depart the third virtual parking space.

Figure 10:
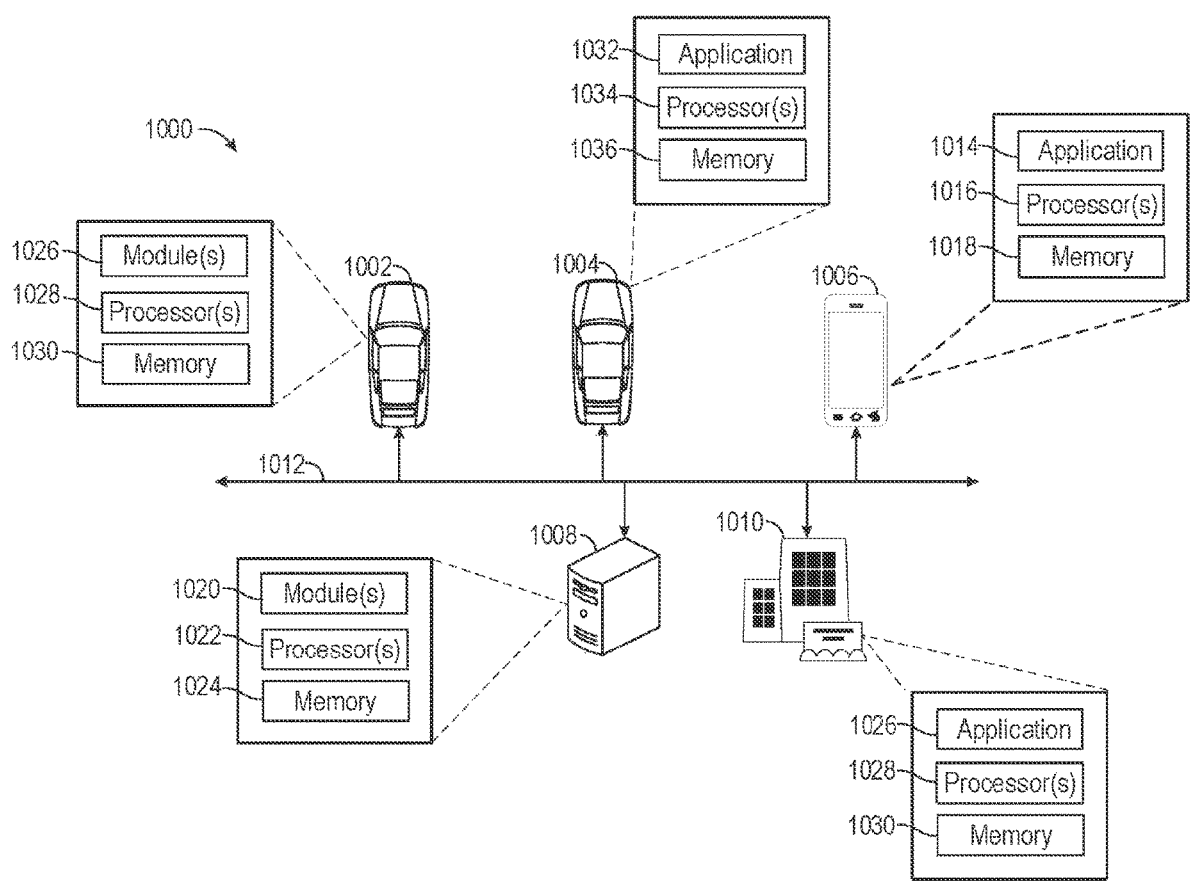
FIG. 10 illustrates an example of a system, in accordance with one or more embodiments of this disclosure.

FIG. 10 illustrates an example of a computing system 1000, in accordance with one or more embodiments of this disclosure. In one or more embodiments, the system 1000 may include at least one or more survey vehicles 1002, one or more vehicles 1004 (which may be vehicles that reserve or are assigned virtual parking spaces as described herein), one or more user devices 1006, one or more servers 1008, and/or one or more infrastructure systems 1010.

In one or more embodiments, a survey vehicle 1002 may be a vehicle that is used to map a provided location in which vehicles are expected to park. These sensors may include any type of sensor that a vehicle may be equipped with (for example, ultrasonic sensors, temperature sensors, lidar, radar, cameras, etc.). This mapping may involve at least gathering data about the location, identifying portions of the location that are suitable for usage as vehicle parking spaces, and generating virtual parking spaces within those portions (among various other operations). The vehicle 1004 may be a vehicle that reserves and/or is assigned one of the virtual parking spaces generated based on the mapping performed by the survey vehicle 1002.

In one or more embodiments, the one or more user devices 1006 may be devices that may be used by a user associated with a vehicle 1004 that may park at a parking location including virtual parking spaces. For example, a user device 1006 may include a smartphone, laptop, desktop, or the like. A user device 1006 may allow a user to perform any number of functions, such as reserving a parking space, viewing a map of the parking location upon arrival, and/or any other relevant functions. Additionally, a vehicle 1004 may include a human-machine interface (HMI) that may allow the user to perform the same or similar functions.

In one or more embodiments, the infrastructure systems 1010 may be systems existing at the parking location that may assist in performing any of the operations described herein. For example, the infrastructure systems may include buildings at the parking location (such as the house 114 illustrated in FIG. 1), camera systems, and/or any other types of infrastructure. In one or more embodiments, the one or more servers 1008 may be remote servers that may perform any of the analyses described herein. For example, the remote servers 1008 may receive data obtained from a survey vehicle 1002 (or other source), and may generate virtual parking spaces based on this data. The remote servers 1002 may also perform any other functions described herein, including storing parking reservations, facilitating communications between the survey vehicle 1002 and third parties (for example, a towing company), and/or any other functions. As aforementioned, any of the operations described herein as being performed by the survey vehicle 1002 may also be performed by infrastructure 1010 and/or a remote server 1008.

Figure 11:
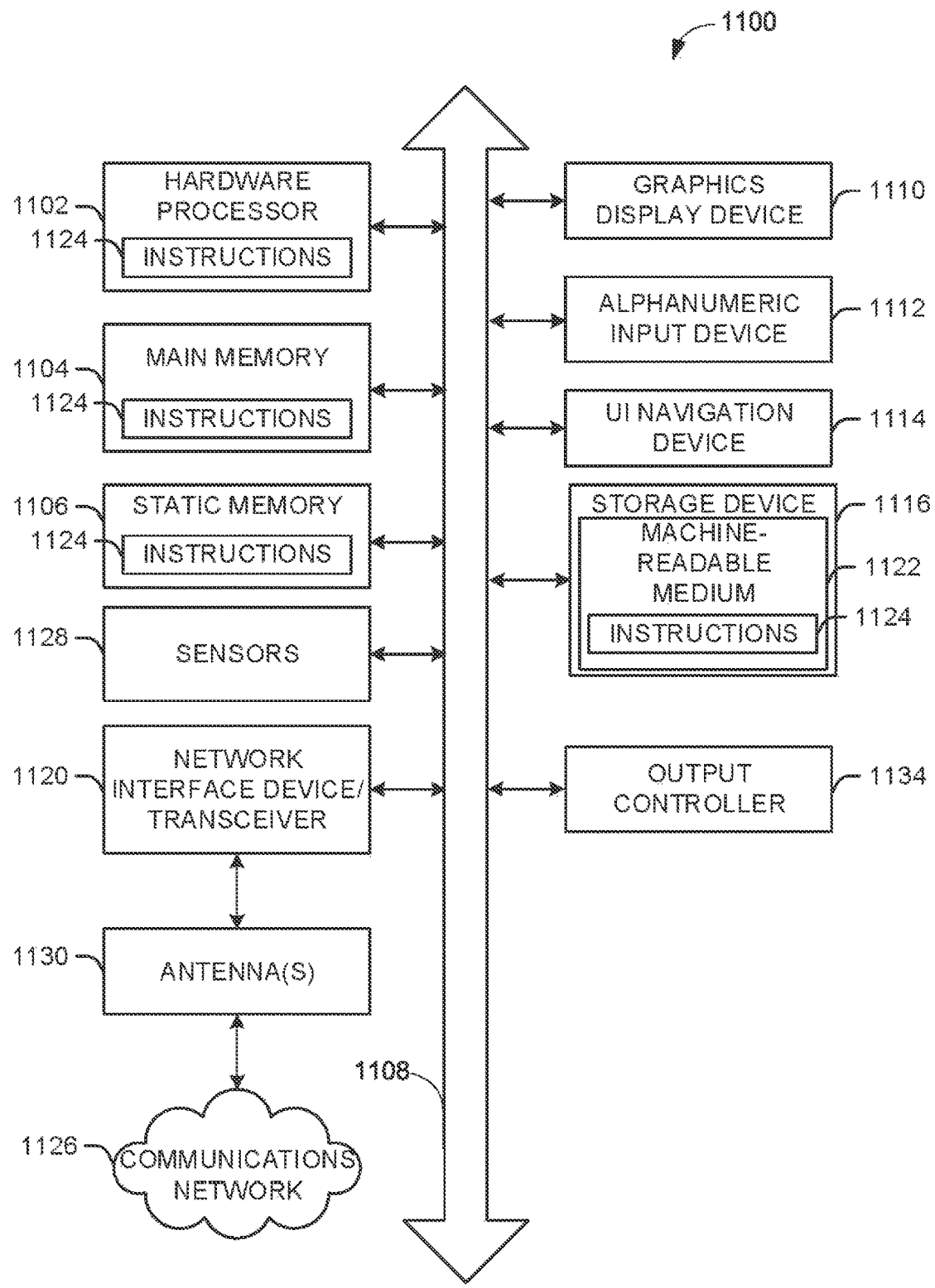
FIG. 11 illustrates an example of a computing system, in accordance with one or more embodiments of this disclosure.

In one or more embodiments, any of the one or more survey vehicles 1002, one or more vehicles 1004, one or more user devices 1006, one or more servers 1008, and/or one or more infrastructure systems 1010, and/or any other elements of the system 1000 may include any of the components of the machine 1100 described with respect to FIG. 11. That is, as illustrated in the figure, these elements of the system 1000 may include one or more processor(s) and memory, as well as at least any other elements described as being included in the machine 1100. That is, although the figure may only depict a particular element of system 1000 as having one or more processors, memory, and one or more modules, this may not be intended to be limiting in any way.

FIG. 11 depicts a block diagram of an example machine 1100 upon which any of one or more techniques (e.g., methods) may be performed, in accordance with one or more example embodiments of the present disclosure. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environments. The machine 1100 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a network interface device/transceiver 1120 coupled to antenna(s) 1130, and one or more sensors 1128, such as a global positioning system (GPS) sensor, a compass, an accelerometer, or other sensor. The machine 1100 may include an output controller 1134, such as a serial (e.g., universal serial bus (USB), parallel, or other wired or wireless (e.g., infrared (IR)), near field communication (NFC), etc.) connection to communicate with or control one or more peripheral devices (e.g., a printer, a card reader, etc.).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A system comprising:
    a processor; and
    a memory storing computer-executable instructions, that when executed by the processor, cause the processor to:
    receive, from a first vehicle, sensor data relating to a first location, wherein the sensor data is captured by the first vehicle along a route at the first location;
    receive, from the first vehicle, an indication that a first portion of the first location is a non-parking portion;
    send, to the first vehicle and prior to receiving the sensor data, an indication that a second portion of the first location is a potential parking location; and
    generate, based on the sensor data, the indication that the first portion is a non-parking portion, and the indication that the second portion is a potential parking location, a first virtual parking space of a virtual parking location within the second portion of the first location.

2. The system of claim 1, wherein the computer-executable instructions further cause the processor to:
    receive, from the first vehicle, an indication that a first portion of the first location is a non-parking portion, wherein the first virtual parking space is generating in a second portion of the first location based on the indication.

3. The system of claim 2, wherein the computer-executable instructions further cause the processor to:
    send, to the first vehicle and prior to receiving the sensor data, an indication that a third portion of the first location is a potential parking location, wherein the sensor data is captured by the first vehicle along a route within the second portion.

4. The system of claim 1, wherein the computer-executable instructions further cause the processor to:
    generate, based on the sensor data, a virtual egress or ingress path through the virtual parking location; and
    send, to a second vehicle an instruction to traverse the virtual egress or ingress path through the virtual parking location.

5. The system of claim 1, wherein the computer-executable instructions further cause the processor to:
    receive, from a second vehicle, a request to reserve the first virtual parking space or automatically assign the first virtual parking space to the second vehicle.

6. The system of claim 1, wherein the computer-executable instructions further cause the processor to:
    receive, from the first vehicle, an indication that a third vehicle is improperly parked within a third virtual parking space within the virtual parking location; and
    send, to the third vehicle, an indication to depart the third virtual parking space.

7. The system of claim 1, wherein the computer-executable instructions further cause the processor to:
    receive, from the first vehicle, an indication that a third vehicle is improperly parked within a third virtual parking space within the virtual parking location; and
    send, to the third vehicle, an instruction for the third vehicle to adjust to a different position within the third virtual parking space.

8. A method comprising:
    receiving, by a processor and from a first vehicle, sensor data relating to a first location, wherein the sensor data is captured by the first vehicle along a route at the first location;

receiving, by the processor and from the first vehicle, an indication that a first portion of the first location is a non-parking portion;

sending, by the processor, to the first vehicle, and prior to receiving the sensor data, an indication that a second portion of the first location is a potential parking location; and generating, by the processor and based on the sensor data, the indication that the first portion is a non-parking portion, and the indication that the second portion is a potential parking location, a first virtual parking space of a virtual parking location within the second portion of the first location.

9. The method of claim 8, further comprising:

generating, based on the sensor data, a second virtual parking space within the first location, wherein the second virtual parking space is a different type of parking space than the first virtual parking space.

10. The method of claim 8, further comprising:

receiving, from the first vehicle, a virtual egress or ingress path through the virtual parking location.

11. The method of claim 8, further comprising:

receiving, from a second vehicle, a request to reserve the first virtual parking space or automatically assign the first virtual parking space to the second vehicle.

12. The method of claim 8, further comprising:

receiving, from the first vehicle, an indication that a third vehicle is improperly parked within a third virtual parking space within the virtual parking location; and sending, to the third vehicle, an indication to depart the third virtual parking space.

13. A non-transitory computer-readable medium storing computer-executable instructions, that when executed by a processor, cause the processor to perform operations of:

receiving, from a first vehicle, sensor data relating to a first location, wherein the sensor data is captured by the first vehicle along a route at the first location;

receiving, by the processor and from the first vehicle, an indication that a first portion of the first location is a non-parking portion;

sending, to the first vehicle and prior to receiving the sensor data, an indication that a second portion of the first location is a potential parking location; and generating, based on the sensor data, the indication that the first portion is a non-parking portion, and the indication that the second portion is a potential parking location, a first virtual parking space of a virtual parking location within the second portion of the first location.

14. The non-transitory computer-readable medium of claim 13, wherein the computer-executable instructions further cause the processor to perform operations of:

generating, based on the sensor data, a second virtual parking space within the first location, wherein the second virtual parking space is a different type of parking space than the first virtual parking space.

15. The non-transitory computer-readable medium of claim 13, wherein the computer-executable instructions further cause the processor to perform operations of:

receiving, from the first vehicle, a virtual egress or ingress path through the virtual parking location.

16. The non-transitory computer-readable medium of claim 13, wherein the computer-executable instructions further cause the processor to perform operations of:

receiving, from a second vehicle, a request to reserve the first virtual parking space or automatically assign the first virtual parking space to the second vehicle.

\* \* \* \* \*